Sept. 8, 1964   W. W. DAVIDSON   3,147,970
DOCUMENT TRANSPORT AND STACKING DEVICE
Filed Sept. 7, 1962   2 Sheets-Sheet 1
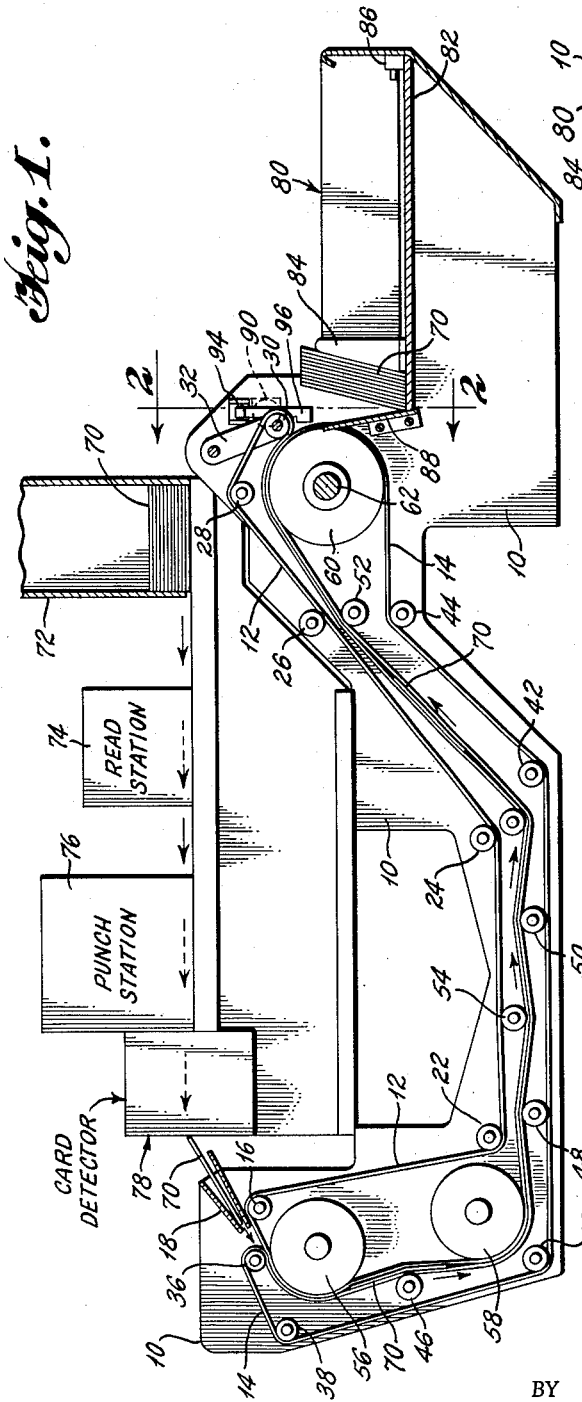
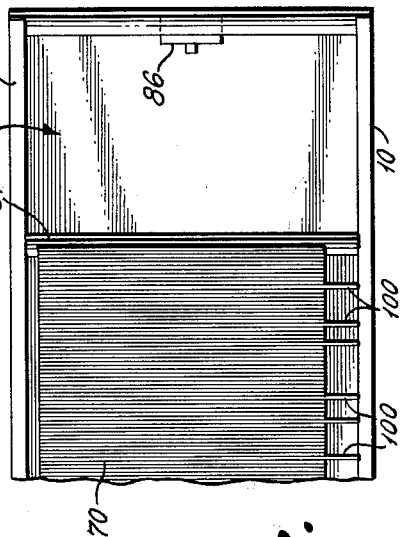
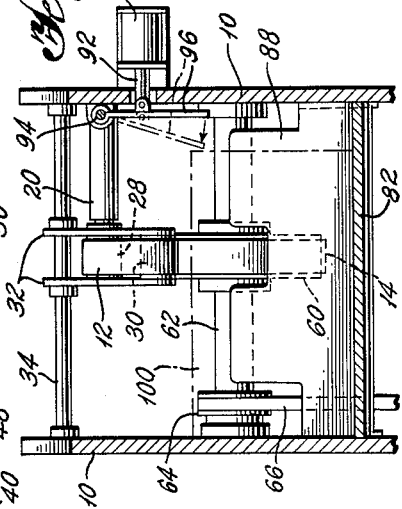
INVENTOR
Woodrow W. Davidson
BY John R. Manning
ATTORNEY Sept. 8, 1964   W. W. DAVIDSON   3,147,970
DOCUMENT TRANSPORT AND STACKING DEVICE
Filed Sept. 7, 1962   2 Sheets-Sheet 2

United States Patent Office 3,147,970
Patented Sept. 8, 1964

3,147,970
DOCUMENT TRANSPORT AND
STACKING DEVICE
Woodrow W. Davidson, Dallas, Tex., assignor to Sperry
Rand Corporation, New York, N.Y., a corporation of
Delaware
Filed Sept. 7, 1962, Ser. No. 222,003
5 Claims. (Cl. 271—57)

This invention relates to document handling and more specifically to a document transport and stacking device for directing documents, such as charge plate invoices or punched cards, from an input hopper to an output hopper.

The increased popularity of the credit charge plate in many retail operations has resulted in a similar increase in clerical procedures. The merchandiser or retailer must assemble all the charge invoices for each customer and post the charges to the customer's account. Periodically, a statement must be rendered to the customer as to the condition of his account. To meet this increased use of credit operations, character recognition equipment is employed to read the customer account number which is transferred from the charge plate to the invoice. In addition, the charge plate recorder may include means for recording on the charge invoice the cash amount of the sale and this amount is also read by the character recognition equipment. After the customer account number and the cash amount of the sale have been read and analyzed by the character recognition system, the characters or symbols may be transferred to a second "language" such as holes in a punched card or a magnetic code on a magnetic tape or drum. In the case of the punching operation, the symbols or characters so read as the result of a character scanning operation may be punched in the same invoice from which the characters were read or may be punched in a second card or tape. After the customer's account number and the cash amount of the sale have been so recorded, the customer posting and billing procedures are greatly simplified since machines can now be utilized to mechanically or electrically sort the documents and render the periodic statement.

It is desirable that the credit invoices or sales slips be processed in a rapid manner and without multilation. Many document handling machines have a front loading hopper and the documents are fed from the hopper to the processing areas of the machine and then to an output hopper located at the rear of the machine. This procedure necessitates that the operator pass to the rear of the machine to remove the documents and to observe the stacking operation. It is desirable, therefore, that means be employed to return the documents to the front of the machine and to an output hopper juxtaposed to the document input hopper. Accordingly, the trips to the rear of the machine to remove the documents are eliminated.

The processing of paper documents such as the cards or invoices just described, anticipates that certain of the documents may not pass through the machine but may jam or otherwise become lodged in the document transport mechanism in such a manner that the document will not be transferred to the output hopper. It is, therefore, desirable that means be employed to detect this condition as soon as it occurs and thus signal the operator and halt the machine.

In character reading operations, it is recognized that all the documents cannot be read. Documents that are torn, have smudges on the character area, have missing or poorly formed characters, may not be read. Accordingly, an output hopper must be provided for the documents that were successfully read and interpreted and a second output hopper for receiving the rejected or non-read documents. A great savings in space and transporting mechanism would be accomplished if both the read documents and the rejected documents could be contained in the same output hopper but still retain their identity as to whether the documents had been read or not.

Accordingly, it is the principal object of the present invention to improve document transport devices.

It is a further object of the present invention to improve document stacking devices by eliminating the reject hopper.

It is another object of the present invention to improve document sensing means to eliminate card jams.

It is a further object of the present invention to provide means for transporting documents from a first hopper to a juxtaposed hopper.

It is still another object of the present invention to provide means for detecting document jams by inspecting the path followed by the document for the presence of a document as well as for the absence of a document.

According to the present invention, any suitable means may be employed to transport the cards or documents from the document input hopper to a reading station and on to a punching station. After leaving the punching station and before admission to a pair of flexible belt transport means, the presence of a card is detected by a first detecting means. If a card or document has been fed from the input hopper and does not emerge from the punchnig station at the appropriate time, the card presence detector will detect this condition and signal the operator, thus indicating a card jam. If the presence of a card is detected, the card or document enters an aligning mechanism for transportation to the output hopper. Immediately after the card has entered the flexible belt transport system, a second card detector senses the exit position of the punch station for the absence of a card. If a card is not present, the machine operation continues. If a card has emerged from the punched station but has been detained or jammed for any reason, the card absence detector will detect this condition and signal the operator or turn off the machine.

The documents emerge from the belt transport system and are stacked in a neat and orderly pile in a single output hopper. If for some reason a particular document has not been read at the reading station, means are provided to signal a reject relay positioned at the exit position of the belt transport means. The reject relay will be actuated and cause the rejected document to be off-set in the stack and a visual inspection will imediately disclose a rejected or unread document interspersed with the read documents.

Further features and objects of the invention will be found throughout the more detailed description and a better understanding of the invention will be afforded by the following detailed description considered in conjunction with the accompanying drawings in which:

FIGURE 1 is a front elevational view of the document transport and stacking device of the present invention with one of the side support frames removed;

FIGURE 2 is a sectional view taken along the lines 2—2 of the FIGURE 1 and showing the document discharge area and the reject relay;

FIGURE 3 is a plan view of the document output hopper showing the off-set rejected documents and the non-rejected documents;

Figure 4:
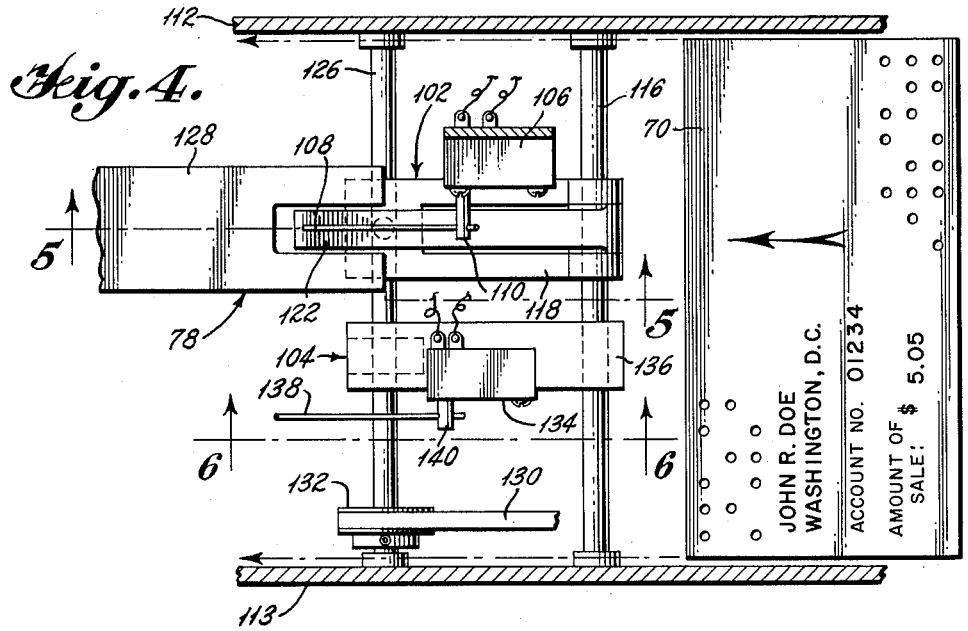
FIGURE 4 is a detailed view of the card detector of the FIGURE 1.

As shown in the FIGURE 1, the main supporting member for the document transport and stacking device is a frame 10. The frame 10 would normally have two elements which are substantially identical to the frame 10 shown in the FIGURE 1 and capable of supporting the pulleys and drive means to be hereinafter described. FIGURE 1 shows one of the frames 10 removed and the relative positions of the frames 10 in the device which was constructed and operated in accordance with the principles of this invention may best be seen from the FIGURE 2. The frame 10 is designed to support the means for receiving the documents at the output of the card detector, transport the documents around and under the machine supporting the read station and the punch station, and further transport the documents to the output hopper located juxtaposed to the input hopper. The specific design of the frame 10 may take any configuration as long as it is capable of supporting the means for performing these functions.

As shown in the FIGURE 1, a series of belts and pulleys transport the documents through the system. As shown, there is an upper belt 12 and a lower belt 14. The upper belt 12 rotates in a counter clockwise manner whereas the lower belt 14 rotates in a clockwise manner. The belts 12 and 14 are driven in frictional engagement from the time the document is received until the document is discharged at the output hopper. The belts 12 and 14 then separate and return to the point where the documents are received and again join and rotate while frictionally engaged. The belts 12 and 14 follow a generally U-shaped path. The upper belt 12 is supported by a pulley 16 located immediately below the document entrance point 18. The entrance slot 18 for the documents may be a pair of flat plates mounted between the frames 10 and having the entrance portion somewhat wider than its exit portion. In other words, the slot 18 is of a V configuration with an open apex. The slot 18 also serves to align the documents before entrance into the belt transport means. The pulley 16 is mounted upon a suitable shaft, such as the shaft 20 as shown in the FIGURE 2, and the shaft 20 is supported by one or both of the frames 10. Mounted in a similar manner, are the pulleys 22, 24, 26 and 28 which form the return path for the upper belt 12.

Located at the point where the upper belt 12 reverses its direction, is a pulley 30, which pulley forms a portion of the document discharge area of the upper belt system. As shown in the FIGURE 2, the pulley 30, shown under the belt 12, is mounted within a pair of arms 32, which arms 32 are supported between the frames 10 by the rod or shaft 34. Mounted in such a manner, the arms 32 may be rotated in a counter clockwise manner thus causing the pulley 30, engaging the belt 12 to be tightened.

Located in a similar manner as the pulley 30 at the discharge area, a pulley 36, of the FIGURE 1, is located at the entrance portion of the belt system at the point where the lower belt 14 changes its direction. As shown, the pulleys 38, 40, 42 and 44 form the return path for the lower belt 14. In addition, the lower belt 14 is engaged by the pulleys 46, 48, 50 and 52. The pulleys 48 and 50 are positioned on the frame 10 to engage the lower belt 14 both during its document carrying path and its return path. In a similar manner, the pulley 54 engages the upper belt 12 during its document carrying path and its return path. A larger pulley 56 engages the upper belt 12 at the document entrance and due to its larger diameter, will not bend the document in such a manner to cause it to break or tear. Similarly, the larger pulley 58 located approximately below the pulley 56 is in engagement with the upper belt 12 and changes the direction of the document from approximately a vertical path to a horizontal path and the larger pulley 60 is positioned within the frame 10 at the discharge area and engages the lower belt 14.

As shown in the FIGURE 2, the pulley 60 is mounted upon a shaft 62 which is journaled between the frames 10. The pulley 60 is rigidly connected to its shaft 62 and through a second pulley 64 rigidly affixed to the shaft 62, which pulley 64 and its engaging belt 66 forms a driving means for the entire document transport system. The belt 66 may be connected to any suitable means such as an electric motor for providing rotary motion to the shaft 62 which imparts the rotary motion to all the elements of the document transport means.

As shown in the FIGURE 1, documents 70 are transported by any convenient means from the document input hopper 72 to a read station 74. After the documents have been read at the read station 74 by any conventional means such as a character or hole recognition system, the document 70 continues to a punch station 76 and to a card detector 78, which is shown in detail in the FIGURES 4, 5 and 6. When the document emerges from the card detector 78 it enters the entrance slot 18 (FIGURE 1) and is transported between the upper belt and the lower belt 14 to an output hopper 80, shown generally in the FIGURES 1, 2 and 3.

The document output hopper 80 is positioned between the frames 10 and adapted to receive the documents. The frames 10 form the side supports for the documents and the bottom support is shown as the member 82. Positioned within the output hopper 80 and mounted for horizontal movement is a pressure plate 84. The pressure plates 84 has a side positioned against the documents which side is slightly depressed from the vertical so that the documents 70 are inclined away from the discharge area formed by the upper belt 12 and the lower belt 14. The pressure plate 84 is mounted within the document hopper 80 in such a manner that it is driven rearwardly as the documents are discharged. Positioned at the rearwardmost location of the output hopper 80 is a stacker limit switch 86. When the hopper 80 is full, the pressure plate 84 will press against the stacker limit switch 86 and signal the operator that the machine must be halted or the documents removed from the output hopper 80.

As shown in the FIGURES 1 and 2, a stripper member 88 is mounted on the frame 10 and has a portion extending alongside the large pulley 60. As a card is discharged from between the upper belt and the lower belt 14, the extended portion of the stripper member 88 will engage the documents 70 and force them into the output hopper 80.

It was indicated earlier that provision must be made for the reject documents which occur as a result of the document or card 70 being in such a condition that it cannot be read at the reading station 74. The present invention provides for a document output hopper 80 which is somewhat wider than the widest card to be accommodated. The rejected documents are stacked along with the non-rejected documents but displaced slightly to the left as one faces the machine at the discharge area. Mounted outside the frame 10 is a rejected solenoid 90 having a plunger 92 extending through the frame 10 and engaging an arm 96 which pivots about the point 94. As shown in the FIGURE 2, the reject solenoid 90 is normally energized thus positioning the arm 96 out of the way of the cards being discharged. If a document is not read at the read station 74, then the reject solenoid 90 is deenergized at the time that the card emerges from the belt system into the ouput hopper 80, by rotating the arm 96 about its pivot point 94. This action of the solenoid 90 and its connected arm 96 causes the rejected document 100 to be gently forced to the left into the position as shown in the FIGURES 2 and 3. Thus, the rejected documents 100 are stacked along with the non-rejected documents 70 in such a position that the operator may readily remove the rejected documents 100 at will.

Figure 5:
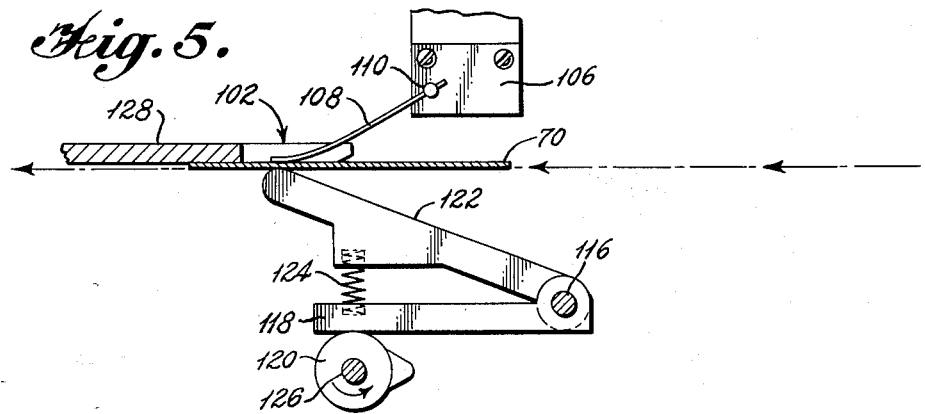
FIGURE 5 is a cross sectional view taken along the line 5—5 of the FIGURE 4 and showing the document presence detector.

The card detector 78 of the FIGURE 1 is shown in detail in the FIGURE 4. The card or document detector 78 comprises means to both sense for the presence of a document and a short time later, to sense for the absence of a document. If a document is not present when it should be, the presumption is that the document has jammed and remains in an unwanted position in the machine and the machine must be halted. Since it is possible for a document to become jammed upon exit from the punch station 76, and thus render the document presence detector ineffective to half the machine, the card absence detector detects for the absence of a card and if no card or document is present, normal operations continue; however, if a card is present, then the document absence detector detects the card and indicates that the card or document has become lodged while leaving the punch station and the operation must be inhibited.

As shown in the FIGURE 4, the document 70 is shown approaching the document presence detector 102 and the document absence detector 104. The document presence detector 102 comprises a switch 106 having a switch contact arm 108 mounted for rotatable movement by rotation of a shaft 110 extending from the switch 106.

Forming the supporting sides for the card detector 78 are the members 112 and 113. Positioned between the members 112 and 113 and perpendicular thereto is a shaft 114 upon which the document presence detector 102 and the document presence detector 104 are partially mounted. As shown best in the FIGURE 5, an arm 118 is mounted for rotational movement about the shaft 116 and has its leftmost end resting upon a cam 120. Also mounted about the shaft 116 and extending upwardly approximately 40 degrees from the arm 118 is the extension finger 122. Mounted directly above the arm 118 and the cam 120 is a spring 124 which resiliently couples the arm 118 to the extension 122. The tip of the extension finger 122 is positioned directly below the document path and slightly touching the document 70 as it passes. Extending from the switch 106 is the switch contact arm 108 which extends downwardly (FIGURE 5) and slightly engages the document from its upper side. The cam 120 is mounted upon a shaft 126 for rotational movement thereabouts and at the time that a document should be present between the switch contact arm 108 and the extension finger 122, the cam follower of the cam 120 rotates in the manner shown and engages the bottom side of the arm 118. The switch contact arm 108 and the extension finger 122 are positioned between the fork of a bifurcated member 128 which forms a portion of the card way and serves to retain the document in the document path.

As previously indicated, when a document 70 (or a rejected document 100) is travelling along the card way and should be under the switch contact arm 108 and above the extension finger 122, the cam follower of the cam 120 rotates in synchronism and engages the arm 118 and through the resilient coupling means 124, gently forces the extension finger 122 upwardly. If a document 70 is present as shown in the FIGURE 5, then the resilient means 124 takes up the motion and the extension finger 122 remains substantially in the position shown. If a document is not present under the switch contact arm 108 during the document sensing cycle, when the cam follower of the cam 120 engages the arm 118, the extension finger 122 is free to move upwardly and engage the arm 108 and thus rotate the switch contact arm 108 about the shaft 110 and cause the switch 106 to emit a signal to halt the machine.

The cam 120, which is mounted upon the shaft 128 may be driven by any suitable means coupled to a belt 130 and a pulley 132 which are connected to the shaft 126. The shaft 126 is mounted between the sides 112 and 113 of the document detector in such a manner to permit rotational movement thereof.

The only requirement of the driving means engaging the belt 130 to rotate the cams on the shaft 126 is that synchronism be maintained between the engagement of the cam follower and the predicted presence of the card immediately below the switch contact arm 108 and above the extension finger 122.

Figure 6:
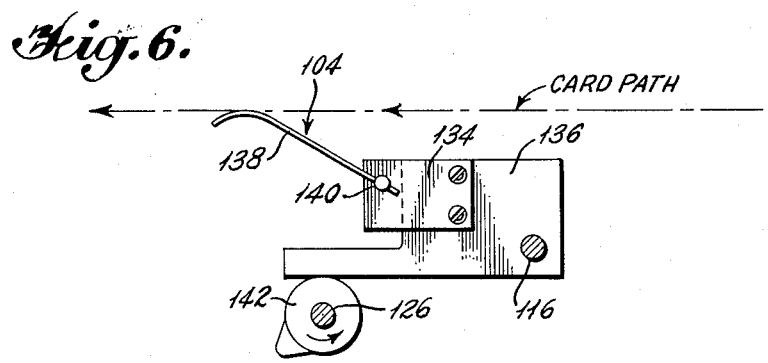
FIGURE 6 is a sectional view taken along the lines 6—6 of the FIGURE 4 and showing the document absence detector.

As shown in the FIGURE 6, the document absence detector 104 comprises a switch 134 mounted on a supporting member 136. As shown in the FIGURES 4 and 6, the switch 134 has a switch contact arm 138 extending from a shaft 140, which shaft 140 is journaled within the switch 134 to cause an electrical contact within the switch upon movement of the switch contact arm 138. The supporting member 136 for the switch 134 is mounted for rotational movement about the shaft 116 and has an elongated portion extending away from the shaft 116 and positioned to ride upon a cam 142 which cam is also secured to the shaft 126.

The cam follower of the cam 142 is connected to the shaft 126 in timed relation to sense for the absence of a document a short time after the document presence detector 102 has sensed for the presence of a document. In normal operation, the cam follower of the cam 142 will engage the extended portion of the supporting member 136 and pivot the supporting member 136 about the shaft 116. Since the switch 134 is rigidly secured to the supporting member 136, the switch 134 and its switch contact arm 138 will oscillate about the shaft 116 and force the switch contact arm 138 into the card or document path. If a document is not present in the card path, then the switch 134 is not actuated; however, if a document is present above the switch contact arm 138 and in the card path at the time that the supporting member 136 is pivoted about the shaft 116, then a jam has occurred and the engagement of the card or document with the switch contact arm 138 will halt the movement of the switch contact arm 138 and as the oscillation of the switch 134 continues a signal will be generated from the switch 134 due to the closing of the contacts within the switch and immediately halt the operation of the machine.

Thus, there has been described a novel document transport and stacking device capable of rapidly advancing documents from an input hopper 72 through the system to an output hopper 80. As the documents are fed from the input hopper 72, they are advanced to a read station 74 and to a punching station 76. As the cards or documents emerge from the punch station 76, a document presence detector 102 (FIGURES 4 and 5) senses for the presence of the document and if the document is present, it enters the entrance slot 18 and engages the upper belt 12 and the lower belt 14 to advance through the belt system to the document output hopper 80. If the document presence detector 102 does not detect a document at the position which has been predicted, then the operation of the machine is halted and the operator may take corrective steps to resume operation of the machine if a jam has occurred.

Assuming that a document has appeared at the card detector 78 and its presence has been detected by the document presence detector 102, and the document continues through the belt system, the document absence detector 104, will detect for the absence of a document to insure that a document has not jammed in the system as it left the punch station 76. If a document is present in this position at the time predicted, then the document absence detector 104 will so indicate and halt the machine.

As the documents emerge between the belts on 12 and 14, the stripper member 88 engages the leading edge of the documents and stacks them in the output hopper 80 against the pressure plate 84 as shown in the FIGURES 1 and 3. When the hopper 80 is full, the stacker limit switch 86 will signal this condition to the operator and halt the operation of the machine.

If for some reason a document was not read at the read station 74, then as this document emerges from the belts 12 and 14 into the output hopper area 80, the solenoid 90 will be actuated and the engagement of the arm 96 with the rejected document 100 will cause the documents to be gently forced to the left as shown in the FIGURES 2 and 3. The rejected documents are stacked as shown in the same hopper as the non-rejected documents except slightly removed to the left where they may be readily removed as desired.

Thus, the present invention may be embodied in other specific forms without departing from the spirit and the essential characteristic of my invention. The present embodiment is therefore to be considered in all respects as illustrative and the scope of the invention being indicated by the appended claims rather than the foregoing description, and all changes which come within the meaning and range of the equivalency of the claims are therefore intended to be embraced therein.

What is claimed is:

1. A document transport for transferring documents from an input hopper to a processing station, comprising a detecting station positioned adjacent the processing station, a flexible belt transport mechanism for receiving documents from said detecting station and transporting the documents to a point remote from said detecting station, an output hopper positioned to receive and stack the documents at the remote point, said detecting station further including means to sense for the presence of a document at a predetermined time, further means to sense for the absence of a document at a predetermined time different than the presence predetermined time, and signalling means coupled to said means and said further means to sense to indicate conditions contrary to that sensed for by said means to sense for the presence and said means to sense for the absence, of a document.

2. A document transport forming a document path and adapted to transfer documents in synchronism, comprising first detecting means positioned adjacent said document path, said means including a sensing arm located below said document path, a switch having an extended finger position immediately above said sensing arm, and means to rotate in synchronism to the document travel the sensing arm upward to engage the lower side of a document if present and the said extended finger if a document is not present; second detecting means positioned adjacent said document path, said means including a support mounted for oscillation about a shaft, a switch positioned on said support and having an extended finger positioned below said document path, and means to rotate in synchronism to the document travel said support and thereby expose said extended finger in said document path; and means coupled to said first and said second detecting means for indicating the absence of a document when synchronously detecting for the presence of a document and for indicating the presence of a document when synchronously detecting for the absence of a document.

3. A document transport forming a document path for advancing documents, some of which may be reject documents, past a read station comprising first detecting means positioned adjacent said document path, said means including a sensing arm located below said document path, a switch positioned above said document path and having a finger juxtaposed said path and immediately above said sensing arm, and means to rotate in synchronism to document travel the sensing arm upward to engage the lower side of a document if present and the said finger if a document is not present; second detecting means positioned adjacent said document path, said means including a support mounted for oscillation about a shaft, a switch positioned on said support and having a finger positionable in said document path, and means to rotate in synchronism to document travel said support and thereby expose said finger in said document path; means coupled to the switches of said first and second detecting means for indicating the absence of a document when detecting for the presence of a document and for the presence of a document when detecting for the absence of a document; a hopper for receiving documents; and means positioned within and adjacent said hopper and actuated by the reading means for offsetting in the hopper, any reject documents.

4. The combination as defined in claim 3 wherein both of said means to rotate include a shaft and camming mechanism.

5. The combination as defined in claim 3 wherein said sensing arm includes a resilient coupling with said means to rotate.

References Cited in the file of this patent

UNITED STATES PATENTS

| | | |
|---|---|---|
| 1,063,338 | Duncan | June 3, 1913 |
| 2,804,304 | Taini | Aug. 27, 1957 |
| 2,940,750 | Mestre | June 14, 1960 |
| 3,065,961 | Campbell et al. | Nov. 27, 1962 |

UNITED STATES PATENT OFFICE
CERTIFICATE OF CORRECTION

Patent No. 3,147,970
September 8, 1964

Woodrow W. Davidson

It is hereby certified that error appears in the above numbered patent requiring correction and that the said Letters Patent should read as corrected below.

Column 1, line 16, for "clearical" read -- clerical --; column 2, line 28, for "punchnig" read -- punching --; column 5 line 8, for "half" read -- halt --.

Signed and sealed this 24th day of August 1965.

(SEAL)
Attest:

ERNEST W. SWIDER
Attesting Officer

EDWARD J. BRENNER
Commissioner of Patents